US011723014B2

(12) United States Patent
Pei et al.

(10) Patent No.: US 11,723,014 B2
(45) Date of Patent: Aug. 8, 2023

(54) CONTROLLING TRANSMITTER OUTPUT

(71) Applicant: Telefonaktiebolaget LM Ericsson (publ), Stockholm (SE)

(72) Inventors: Yali Pei, Beijing (CN); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/603,119

(22) PCT Filed: Apr. 16, 2019

(86) PCT No.: PCT/CN2019/082823
§ 371 (c)(1),
(2) Date: Oct. 12, 2021

(87) PCT Pub. No.: WO2020/210971
PCT Pub. Date: Oct. 22, 2020

(65) Prior Publication Data
US 2022/0201700 A1    Jun. 23, 2022

(51) Int. Cl.
*H04L 1/02* (2006.01)
*H04W 72/121* (2023.01)
(Continued)

(52) U.S. Cl.
CPC ........ *H04W 72/121* (2013.01); *H04B 7/0408* (2013.01); *H04B 7/0452* (2013.01)

(58) Field of Classification Search
CPC .. H04B 7/0695; H04B 7/0452; H04B 17/102; H04B 7/0408; H04B 7/0617;
(Continued)

(56) References Cited

U.S. PATENT DOCUMENTS

| | | | |
|---|---|---|---|
| 2007/0046539 A1* | 3/2007 | Mani | H04B 7/0691 342/383 |
| 2009/0054018 A1* | 2/2009 | Waheed | H03G 3/3047 455/127.1 |

(Continued)

FOREIGN PATENT DOCUMENTS

| | | |
|---|---|---|
| CN | 105337701 A | 2/2016 |
| EP | 2876963 A1 | 5/2015 |

(Continued)

OTHER PUBLICATIONS

Extended European Search Report and Opinion for European Patent Application No. 19925262.8 dated Oct. 24, 2022.

(Continued)

*Primary Examiner* — Khai Tran
(74) *Attorney, Agent, or Firm* — Sage Patent Group

(57) ABSTRACT

A MIMO transmission point utilizes respective pluralities of beam weights to transmit corresponding pluralities of beams to each group of wireless devices, with respective numbers of resources being allocated for transmissions to each group of wireless devices. One method comprises: determining an average output power of the transmission point over a period of time in a first direction; comparing the average output power to an output power reference value; determining a fraction of a pool of available resources for the allocation of data to be transmitted by the transmission point as a function of the comparison; for each group of wireless devices, and determining beam gains in the first direction for each of the plurality of beams and weighting the number of resources allocated to the group of wireless devices according to the determined beam gains to obtain an effective number of resource blocks in the resources in the first direction.

20 Claims, 7 Drawing Sheets

(51) Int. Cl.
  *H04B 7/0408* (2017.01)
  *H04B 7/0452* (2017.01)

(58) Field of Classification Search
  CPC .... H04B 17/21; H04W 52/42; H04W 52/367; H04W 72/0473; H04W 72/1231
  USPC ........................................ 375/267, 260, 265
  See application file for complete search history.

(56) References Cited

U.S. PATENT DOCUMENTS

| | | | |
|---|---|---|---|
| 2013/0163544 A1 | 6/2013 | Lee et al. | |
| 2014/0148181 A1* | 5/2014 | Lee | H04L 5/006 455/452.1 |
| 2018/0279365 A1* | 9/2018 | Wang | H04W 74/0808 |
| 2021/0337559 A1* | 10/2021 | Wigren | H04W 52/225 |

FOREIGN PATENT DOCUMENTS

| | | |
|---|---|---|
| WO | 2009157993 A1 | 12/2009 |
| WO | 2014209083 A1 | 12/2014 |
| WO | 2018056876 A1 | 3/2018 |
| WO | 2018056876 A9 | 3/2018 |
| WO | 2019024925 A1 | 2/2019 |

OTHER PUBLICATIONS

International Search Report and Written Opinion of the International Searching Authority for PCT International Application No. PCT/CN2019/082823 dated Jan. 15, 2020.

ITU-R (Radiocommunication Sector of ITU), "Radiocommunication Study Groups; Recommendation ITU-R M.2012-3, Detailed specifications of the terrestrial radio interfaces of International Mobile Telecommunications—Advanced (IMT—Advanced)," 2018, 210 pages.

\* cited by examiner

CONTROLLING TRANSMITTER OUTPUT

CROSS REFERENCE TO RELATED APPLICATION

This application is a 35 U.S.C. § 371 national stage application of PCT International Application No. PCT/CN2019/082823 filed on Apr. 16, 2019, the disclosure and content of which is incorporated by reference herein in its entirety.

TECHNICAL FIELD

Embodiments of the present disclosure relate to wireless communication, and particularly relate to methods, apparatus and computer programs for controlling the output of a multiple-input, multiple-output (MIMO) transmission point.

BACKGROUND

When any radio equipment is to be deployed, regulatory radio frequency (RF) electromagnetic field (EMF) exposure regulations need to be accounted for. These RF EMF exposure regulations are typically based on the guidelines from the International Commission on Non-Ionizing Radiation Protection (ICNIRP) but may take different forms in different countries and regions. The aim of the RF exposure regulations is to ensure that human exposure to RF energy is kept within prescribed limits, which have typically been set with wide safety margins.

Transmission points for wireless communication networks are increasingly being equipped with advanced antenna systems (AAS). These antenna systems increase the capacity and/or coverage of existing wireless systems by addition of an antenna array. This enables the simultaneous transmission of parallel data streams between a base station and a user, so called multiple-input-multiple-output (MIMO) transmission. In some cases, like when millimeter-wave (mmW) carrier frequencies are used, the main desired effect is rather to enhance coverage by exploiting the high beamforming gain of the new AAS systems.

A consequence of the increasing beamforming gain is that the power is concentrated in beams, in which the power density may be increased as compared to the situation without an AAS. The RF EMF exposure regulations are typically expressed in terms of power density (W/m$^2$) which in the far field is proportional to the effective isotropic radiated power (EIRP), i.e. the power radiated from an antenna with unity antenna gain in all directions. Consequently, the EIRP can be used to determine the power density in the far field. This implies that at a given distance from the antenna, and in the far field, the EIRP will be higher from a node with an AAS, than from a node without such an AAS. The maximum EIRP of a node is typically used when RF EMF compliance distances and exclusion zones are determined, to comply with the RF exposure regulations. The introduction of AAS systems may therefore lead to increased compliance distances and exclusion zones, as compared to without an AAS. Sometimes this can make AAS deployment challenging, e.g. when existing sites are re-used.

The ICNIRP and other RF EMF exposure limitations are usually expressed as an average power density over a specified time interval T. This means that the momentary power density can be higher for short intervals of time, but the time-averaged power density over any time period T must meet the specified limit. To maintain a certain RF EMF compliance distance, which is shorter than that obtained using the maximum momentary power or EIRP of the AAS, the time-averaged power or EIRP over any time T needs to be maintained at or below a pre-determined threshold.

SUMMARY

The present disclosure provides methods, apparatus and computer programs which seek to mitigate these and other problems.

In one aspect, there is provided a method for controlling the output of a multiple-input, multiple-output, MIMO, transmission point for a wireless communications network. The transmission point serves one or more groups of wireless devices, each group comprising one or more wireless devices. The MIMO transmission point utilizes respective pluralities of beam weights to transmit corresponding pluralities of beams to each group of wireless devices, with respective numbers of resources being allocated for transmissions to each group of wireless devices. The method comprises: determining an average output power of the transmission point over a period of time in a first direction of a plurality of directions radiating from the transmission point; comparing the average output power to an output power reference value; determining a fraction of a pool of available resources for the allocation of data to be transmitted by the transmission point, wherein the fraction varies as a function of the comparison between the average output power and the output power reference value; for each group of wireless devices, determining beam gains in the first direction for each of the plurality of beams and weighting the number of resources allocated to the group of wireless devices according to the determined beam gains to obtain an effective number of resources in the first direction for each group of wireless devices; summing the effective numbers of resources in the first direction to obtain an overall effective number of resources in the first direction; comparing the overall effective number of resources to the fraction of the pool of available resources; and scheduling data for transmission to the groups of wireless devices based on the comparison between the overall effective number of resources and the fraction of the pool of available resources.

In a further aspect, the disclosure provides a network node configured to perform the method recited above.

A further aspect provides a computer program for performing the method recited above. A computer program product, comprising the computer program, is also provided.

Another aspect provides a network node for controlling the output of a multiple-input, multiple-output, MIMO, transmission point for a wireless communications network. The transmission point serves one or more groups of wireless devices, each group comprising one or more wireless devices. The MIMO transmission point utilizes respective pluralities of beam weights to transmit corresponding pluralities of beams to each group of wireless devices, with respective numbers of resources being allocated for transmissions to each group of wireless devices. The network node comprises processing circuitry and a non-transitory machine-readable medium storing instructions which, when executed by the processing circuitry, cause the network node to: determine an average output power of the transmission point over a period of time in a first direction of a plurality of directions radiating from the transmission point; compare the average output power to an output power reference value; determine a fraction of a pool of available resources for the allocation of data to be transmitted by the transmission point, wherein the fraction varies as a function of the comparison between the average output power and the output power reference value; for each group of wireless devices, determine beam gains in the first direction for each of the plurality of beams and weight the number of resources allocated to the group of wireless devices according to the determined beam gains to obtain an effective number of resources in the first direction for each group of wireless devices; sum the effective numbers of resources in the first direction to obtain an overall effective number of resources in the first direction; compare the overall effective number of resources to the fraction of the pool of available resources; and schedule data for transmission to the groups of wireless devices based on the comparison between the overall effective number of resources and the fraction of the pool of available resources.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
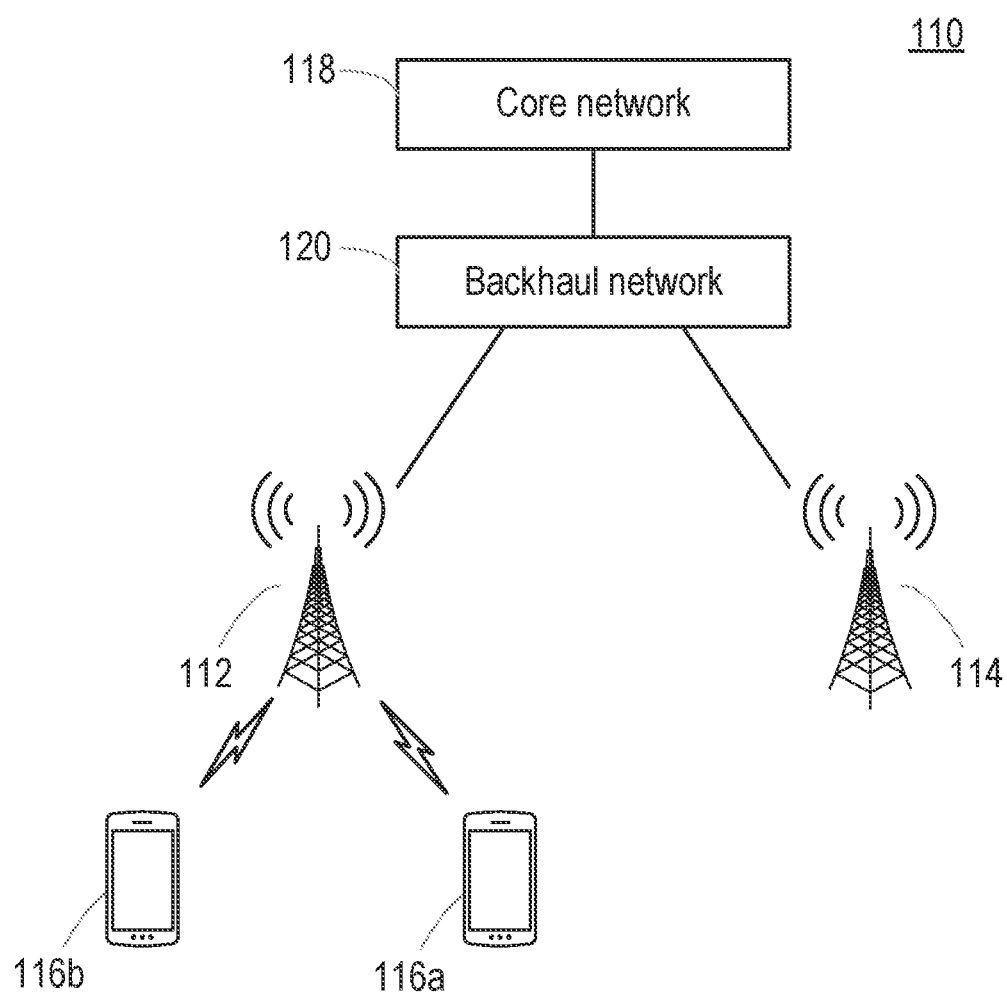
FIG. 1 is a schematic diagram of a wireless communication network according to embodiments of the disclosure.

FIG. 1 shows a communication network 110 according to embodiments of the disclosure.

The network 110 may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1xRTT and High Rate Packet Data (HRPD), just to mention some options. The network 110 may be suitable for providing radio communications meeting one or more of the criteria established by the Next Generation Mobile Networks Alliance for the 5th generation of mobile telecommunications standards. In one embodiment, therefore, the communication network 110 may be a wireless cellular network.

The network 110 comprises one or more radio access nodes 112, 114. In the illustrated embodiment, two radio access nodes 112, 114 are shown, but the skilled person will appreciate that any number of radio access nodes may be provided.

The radio access nodes 112, 114 may be referred to as e.g. base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

The functions of the radio access nodes 112, 114 may be distributed across one or more physical nodes. For example, each radio access node may be divided logically into more than one unit, comprising one or more of the following: a centralized unit (CU), a distributed unit and a radio unit (RU), remote radio head (RRH) or transmission point (TP).

Each radio access node 112, 114 may serve one or more cells of the network 110. Within each cell, wireless devices communicate with the respective radio access node to provide services to users of the devices as will be familiar to those skilled in the art. Each radio access node 112, 114 further communicates with a core network 118 via a backhaul network 120, in order to co-ordinate and control the network 110, and provide access to other parts of the network 110 (e.g. devices in other cells, not illustrated). In FIG. 1, two wireless devices 116a, 116b (collectively, 116) are shown in communication with radio access node 112. The wireless devices 116 may also be known as user equipments (UEs), mobile devices, mobile terminal devices, wireless terminal devices, etc.

The radio access nodes 112, 114 may be capable of performing multiple-input, multiple-output (MIMO) transmissions. Thus, each radio access node 112, 114 may comprise multiple antennas or antenna elements (e.g., arranged in an array). A set of weights may be applied to signals provided to those antennas or antenna elements for transmission, so as to vary the amplitude and/or phase of the signals and result in constructive interference in one or more particular directions emanating from the radio access node. This general technique is known as beamforming and is well understood by those skilled in the art.

MIMO transmissions make use of beamforming techniques to transmit multiple data streams to one or more wireless devices (such as the devices 116). Where those data streams are all transmitted to a single wireless device, the process is known as single-user MIMO (SU-MIMO). Where those data streams are transmitted to multiple wireless devices, i.e., each wireless device receives one or more data streams transmitted by the radio access node, the process is known as multi-user MIMO (MU-MIMO).

Those skilled in the art will appreciate that wireless signals are transmitted between the radio access node 112 and the wireless devices 116 using radio resources which are scheduled according to one or more scheduling algorithms. A scheduler may be provided in the radio access node 112 or logically coupled to the radio access node for this purpose. As used herein, "radio resources" refers to any available resource which can be used to transmit wireless signals, such as frequency (e.g. one or more frequency channels or sub-channels), time (e.g. one or more frames, sub-frames, time slots, etc.) or codes (e.g. as used for code-division multiplexing).

Thus, for downlink communications (i.e. from the radio access node 112 to the wireless devices 116), a pool of available radio resources is distributed for transmissions to the wireless devices 116 according to a scheduling algorithm.

Those skilled in the art will appreciate that the output power of a radio access node varies as a function of the resources it uses for transmissions. For example, when the radio access node is scheduled to transmit using a relatively large amount of resources at any one time (e.g. a relatively large number of frequencies), the output power of that radio access node will also be relatively high; when the radio access node is scheduled to transmit using relatively few resources at any one time (e.g. a relatively low number of frequencies), the output power of that radio access node will be relatively low.

Embodiments of the present disclosure utilize this property to control the output of a transmission point (e.g. a radio access node) of a wireless communications network. In one embodiment, the output of the transmission point is controlled so that the transmitted power is below a threshold that has been pre-determined to meet a regulatory RF EMF exposure requirement.

The radio access node is thus provided with a pool of radio resources with which to schedule transmissions to the wireless devices 116. Embodiments of the disclosure apply limitations to this pool of radio resources so as to limit the output power of the radio access node or transmission point. For example, the radio access node may be permitted to utilize only a fraction of its available pool of radio resources for scheduling transmissions to the wireless devices 116. Further embodiments of the disclosure address the beamforming capability of the radio access node to ensure that the output power in a particular direction is below a threshold that has been pre-determined to meet a the regulatory RF EMF exposure regulation in that particular direction.

Figure 2:
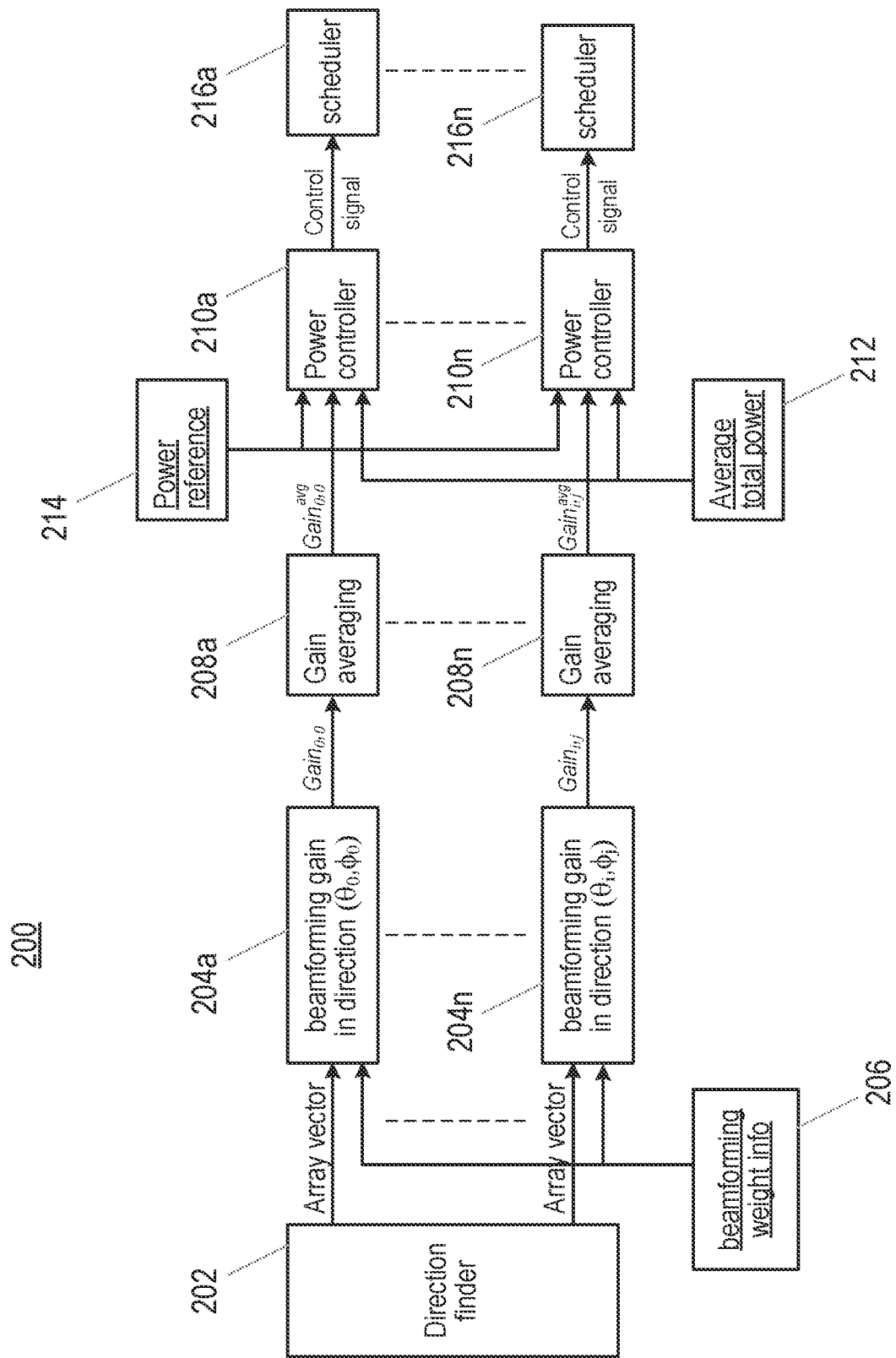
FIG. 2 is a schematic diagram of a scheduling mechanism according to embodiments of the disclosure.

FIG. 2 is a schematic diagram of a scheduling mechanism 200 according to embodiments of the disclosure. The scheduling mechanism 200 may be implemented within a network node such as the radio access nodes 112, 114 described above, or a network node coupled to such a radio access node. It will further be understood by those skilled in the art that modules of the mechanism 200 may be distributed across multiple logical or physical network nodes.

The scheduling mechanism 200 is operative to schedule data for transmission by a transmission point (e.g., the radio access node or a transmission point belonging to the radio access node) to one or more wireless devices (e.g., such as the wireless devices 116 described above), or particularly to one or more groups of one or more wireless devices, such that the transmitted power is below a threshold that has been pre-determined to meet a regulatory RF exposure requirement in one or more (or all) directions emanating from the transmission point.

The mechanism 200 comprises a direction finding module 202, one or more beamforming gain calculation modules 204a to 204n (collectively 204), one or more gain averaging modules 206a, 206n (collectively 206), one or more power controller modules 210a to 210n (collectively 210) and one or more scheduler modules 216a to 216n (collectively 216).

The direction finding module 202 is operative to output a plurality of array vectors (or steering vectors) $\alpha^{i,j}$ corresponding to each of a plurality of directions emanating from (or radiating from) the transmission point. Here i and j are the indexes of the solid angle represented by the direction a in the azimuth and elevation angles respectively.

As will be clear from the following description, the scheduling mechanism 200 is operative to schedule data for transmission to one or more wireless devices, thus controlling the output of the transmission point, so that the power is below a threshold pre-determined to meet a regulatory RF exposure requirement in each of the plurality of directions.

The number of directions to be analysed, and/or their distribution, depends on the implementation of the mechanism. The plurality of directions may be evenly distributed such that the transmit point in directions which are evenly distributed around the transmission point; alternatively, depending on the location of the transmission point and its surrounding geography, the plurality of directions may have a greater density towards areas of higher user equipment density. Further, a greater number of directions to be analysed will result in more refined control of the output of the transmission point, at the cost of greater computational complexity (and vice versa). In the following, for simplicity, it is assumed that the plurality of directions are evenly distributed around the transmission point, such that each array vector corresponds to an equal solid angle.

Here it will be noted that the scheduling mechanism 200 comprises separate control loops for each direction, i.e. one beamforming gain calculation module 204, one gain averaging module 206, one power controller module 210 and one scheduler module 216 for each direction. Those skilled in the art will appreciate that one or more (or all) of these modules may be multiplexed between one or more (or all) of the plurality of directions. Thus the scheduling mechanism 202 may comprise one beamforming gain module 204 multiplexed to perform calculations for multiple directions, and similarly for the gain averaging module 206, the power controller module 210 and the scheduler module 216, in any combination.

In the illustrated embodiment, each array vector (corresponding to one direction emanating or radiating from the radio access node) is output to a corresponding beamforming gain module 204.

Each beamforming gain module 204 further receives beamforming weight information 206 corresponding to the beamforming weights for each of a plurality of groups of one of more wireless devices. Those skilled in the art will appreciate that the transmission point typically serves a large number of wireless devices. These devices may be grouped for the purposes of scheduling and MIMO transmission. So-called multi-user MIMO (MU-MIMO) divides the wireless devices into groups of multiple wireless devices, with each such group being scheduled using the same radio resources (e.g., transmission frequency or frequencies, physical resource blocks, etc.). Here interference between the multiple devices within a group is avoided, or at least reduced, by spatial distribution (e.g., beamforming). Single-user MIMO (SU-MIMO) considers individual wireless devices for the purposes of scheduling, such that a single user is scheduled from a given set of radio resources. Those skilled in the art will appreciate that the transmission point may utilize both SU-MIMO and MU-MIMO at the same time, i.e., transmitting to one or more groups having multiple wireless devices and one or more groups having single wireless devices at the same time (e.g., within a same transmission time interval or TTI).

The beamforming weight information 206 thus comprises the beamforming weights for each group of one or more wireless devices which are scheduled for transmission at a particular point in time (e.g., in a particular TTI). This information is known to the network node in which the mechanism 200 is implemented, based on previous transmissions between the transmission point and the wireless devices (e.g., measurement reports determining the best beamforming weights, etc.) and knowledge of data or control information to be transmitted to the wireless devices.

The number of beamforming weights for a particular group $n_g$ is denoted $N_{w,n_g}$. These weights are denoted $w_{0,n_g}$, $w_{1,n_g}, \ldots, w_{n_w,n_g}, \ldots, w_{N_w-1,n_g}$. Where a group has a single user, $N_{w,n_g}$ is equal to one. The number of multi-user groups is $N_g$.

Those skilled in the art will appreciate that these weights can be generated in any suitable way. For example, the weights may be selected from a predefined codebook of beamforming weights. Alternatively, the weights may be calculated by the solution of a reciprocity-assisted transmission (RAT) optimization problem.

The beamforming gain modules 204 use the array vectors $a^{i,j}$ and the beamforming weights for each group of wireless devices to determine the beam gain in each of the plurality of directions. This value may be determined by summing the contributions of each beamforming weight in the particular direction.

In one embodiment, the beam gain may be further scaled by the fraction of radio resources which are utilized in each direction. That is, the scheduling mechanism 200 (or the network node in which it is implemented) has knowledge of the location of each of the wireless devices served by the transmission point, e.g., through previous transmissions between the transmission point and those devices, in a similar manner to the beamforming weights described above. The scheduling mechanism 200 (or the network node in which it is implemented) further has knowledge of the data which is to be transmitted to those wireless devices, and thus knowledge of the amount of radio resources needed to transmit that data.

Thus, in one embodiment, the beamforming gain modules 204 calculate the scaled beam gain in each of the plurality of directions denoted by i,j, at a particular transmission time interval t, according to the following equation:

$$Gain_{i,j}(t) = \sum_{n_g=0}^{N_g-1} \sum_{n_w=0}^{N_w-1} \left\| (a^{i,j}(t))^H w_{n_w,n_g}(t) \right\|^2 \frac{\eta_{n_g}(t)}{\eta_{max}}.$$

Thus the contribution of each beamforming weight, for each group of wireless devices, in the particular direction i,j is summed. The gain is further scaled by the fraction of resources required for transmission to each group of wireless devices in the particular direction, where $\eta_{n_g}(t)$ is the number of resources required for transmitting to the group $n_g$, and $\Theta_{max}$ is the maximum amount of resources available to the transmission point.

These instantaneous beamforming gains are output from the modules 204 to the gain averaging modules 208, which average the gains in each direction over a defined time window. In one embodiment, the time window may be equal to the time interval T specified in RF EMF exposure standards and regulations, over which the output power and beam gain of a transmission point are to be measured. Alternatively, the time window may be equal to a sampling interval of the control loop described below with respect to FIG. 3.

Thus, in one embodiment, the (scaled) beamforming gains are averaged according to the following equation:

$$Gain_{i,j}^{avg} = \frac{1}{N_{tti}^{win}} \sum_{t=0}^{N_{tti}^{win}-1} Gain_{i,j}(t).$$

where $Gain_{i,j}^{avg}$ is the averaged, scaled beamforming gain in the particular direction denoted by i,j, and $N_{tti}^{win}$ is the number of transmission time intervals in the averaging window.

The average beamforming gain in each direction is thus output to the power controllers 210, which are operable to compute control signals indicating a fraction of the total radio resources available to the transmission point in each of the plurality of directions, such that the transmit power in those directions is controlled to be below a threshold pre-determined to meet a regulatory RF EMF exposure requirement. These control signals are output to the schedulers 216, which schedule data for transmission to the groups of wireless devices in accordance with the control signals The operation of the power controllers 210 and the schedulers 216 is described in more detail with respect to FIG. 3, which shows a feedback control mechanism 300 according to embodiments of the disclosure. The feedback control mechanism 300 may be operable as any of the power controllers 210 and schedulers 216 described above with respect to FIG. 2.

In the illustrated embodiment, the mechanism 300 comprises the following blocks: a controller 302; an adjuster 304; a transmission power calculator 308; a beamforming gain block 311; an averaging block 312; and a gain block 316. The scheduler 216 may be implemented substantially in the transmission power calculator 308. The power controller 210 is implemented in the other blocks of the mechanism 300. The illustrated embodiment further shows a first adding element 310 and a second adding element 314. These adding elements 310, 314 do not form part of the mechanism, but are shown to illustrate where imperfections and measurement disturbances may enter the control loop.

The controller 302 receives a feedback signal which is representative of the average output power of the transmission point $\langle P_{tot} \rangle(s)$ (e.g., the average total power 212 referred to above), as well as an output power reference value $\langle P_{tot} \rangle^{ref}$ (e.g., the reference power 214 referred to above). This output power reference value may be set with reference to a maximum averaged regulatory power $\langle P_{max,regulatory} \rangle$ that has been pre-determined to meet a regulatory RF EMF exposure requirement. For example, in one embodiment the output power reference value $\langle P_{tot} \rangle^{ref}$ is the maximum averaged regulatory power $\langle P_{max,regulatory} \rangle$; in other embodiments, the output power reference value $\langle P_{tot} \rangle^{ref}$ may be set below the maximum averaged regulatory power $\langle P_{max,regulatory} \rangle$. The controller 302 compares the two values and generates a control signal in a manner which will be described in more detail below. In one embodiment, the controller 302 implements a proportional-derivative control scheme when generating the control signal.

In the illustrated embodiment, the control signal $u_{i,j}(s)$ is indicative of a required change in the pool of radio resources. It will be noted here that s is the Laplace transform variable (which is closely related to the angular frequency in the Fourier transform). Thus the control signal commands adjustments to the adjuster 304, making it increase or decrease. The dynamics of the actuator mechanism is therefore $$\dot{\gamma}_{i,j}(t) = u_{i,j}(t),$$

where $\gamma_{i,j}(t)$ is the fractional limitation applied to the pool of available radio resources for scheduling, and where $u_{i,j}(t)$ is the control signal discussed further below. t denotes continuous time. Those skilled in the art will appreciate that the control mechanism may alternatively be implemented in discrete time, e.g., using the Euler approximation or the Tustin approximation. The scheduler may then limit the number of radio resources (e.g., frequency resources such as physical resource blocks, PRBs) it uses, or limit any other quantity that correlates well with the momentary output power.

This control signal is provided to the adjuster 304, which integrates the signal to generate a signal $\gamma_{i,j}(t)$ indicative of the pool of radio resources that may be used for scheduling purposes in the direction i,j.

In some embodiments, this signal may be provided to a limiter (not illustrated), which applies one or more upper and/or lower limits to the signal $\gamma_{i,j}(t)$ to generate a limited signal $\overline{\gamma_{i,j}}(t)$.

The maximum value of (t) is 1.0 since it expresses a fraction of the total available scheduler resources. In some embodiments, the lower value of $\gamma_{i,j}(t)$ may also be limited, to prevent the feedback control mechanism from reducing it to an unphysical value below 0.0, or below some lower value $\gamma_{low}$, which prevents correct operation of the transmission point. The following limitation may therefore be applied to the signals:

$$\gamma_{low} \leq \gamma_{i,j}(t) \leq 1.0$$

This limited signal is provided to the transmission power calculator 308, which converts the fractional limitation on the pool of total available radio resources into an output power, based on the maximum total power of the transmission point $P_{max,site}$. The transmission power calculator 308 also performs scheduling of the data to the limited resources indicated by the control signal $\gamma_{i,j}(t)$. See FIG. 5 below for a more detailed description of that process.

The output power is provided to the first adding element 310 together with a disturbing quantity representative of predicted power errors w(t). Note again that the first adding element 310 is added to describe such an imperfection and is not a part of the mechanism itself. The output of the first adding element 310 is thus representative of the instantaneous output power of the transmission point $P_{tot}(s)$. This quantity is then output to the beamforming gain block 311, which receives the average beam gain $Gain_{i,j}^{avg}$ in the direction i,j and applies that gain to the instantaneous output power of the transmission point $P_{tot}(s)$. In particular, the beamforming gain block 311 may apply a normalized version of the beamforming gain, denoted as $K_{i,j}$, such that the quantity output from the beamforming gain block 311 is the momentary output transmit power in the direction i,j, denoted as $P_{tot,i,j}(s)$.

This quantity is then further averaged in the averaging block 312 to account for the fact that the regulatory RF EMF exposure requirements are expressed in terms of a time-averaged value. For example, the averaging block 312 may implement the averaging according to any suitable algorithm or model. In the illustrated embodiment, the averaging block 312 implements an autoregressive simplified model of the averaging 1/(sT+1), where T is the averaging time. The output of the averaging block 312 is provided to the second adding element 314, which adds it to a quantity e(s) representative of a measurement error. Again, it will be noted that the second adding element 314 and the measurement error are not a part if the mechanism itself, but merely indicate how imperfections may enter the control loop. This is common practice in the field of automatic control. The output of the second adding element 314 is thus equal to the average total output power of the transmission point $\langle P_{tot} \rangle$(s). This quantity is fed back to the controller 302 for use as described above.

Of course, the signal is also applied to the antenna array of the transmission point and transmitted. Here, the antenna array is represented by the gain block 316, which applies the antenna gain G, outputting a signal with a specific output power $\rho_{i,j}(s)$.

As noted above, in some embodiments, the controller 302 may implement a proportional-derivative control scheme. In this case, the control signal generated by the controller 302 may be given by $$u_{i,j}(s) = C_{i,j}T(1+T_{D,i,j}s)(\langle P_{tot} \rangle_{i,j}^{ref} - \langle P_{tot} \rangle_{i,j}(s)).$$

Figure 3:
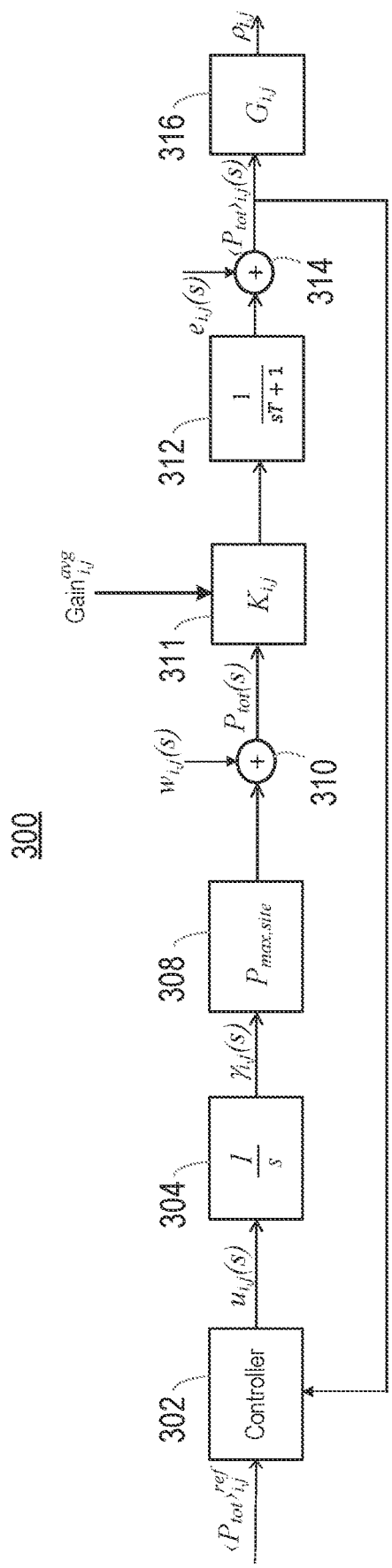
FIG. 3 is a schematic diagram of a transmit power control mechanism according to embodiments of the disclosure.

$C_{i,j}$ denotes the proportional gain, T denotes the averaging time window and $T_{D,i,j}$ the differentiation time. Following standard procedures of automatic control, the poles of the closed-loop system of FIG. 3 are given by the following second order equation $$s^2 + (1/T + P_{max,site}K_{i,j}C_{i,j}T_{D,i,j})s + P_{max,site}K_{i,j}C_{i,j} = 0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as $$s^2 + (\alpha_1 + \alpha_2)s + \alpha_1\alpha_2 = 0.$$

An identification of coefficients and solution of the resulting system of equations reveal that the proportional gain and differentiation time may be selected as $$C_{i,j} = \frac{\alpha_1\alpha_2}{K_{i,j}P_{max,site}},$$

$$T_{D,i,j} = \frac{\alpha_1 + \alpha_2 - \frac{1}{T}}{\alpha_1\alpha_2}.$$

Note that $C_{i,j}$ compensates for the gain variation with the direction, while the differentiation time is not dependent on the direction.

A reason for this choice is that a system with two negative real poles can be expected to be well damped, which is a result of a significant differentiation action. This differentiation action is particularly beneficial in providing fast backoff close to the determined threshold, thus preventing inadvertent excessive output power.

To implement the feedback control mechanism, $\langle P_{tot} \rangle_{i,j}^{ref}$, $\langle P_{tot} \rangle_{i,j}(t)$ and $\langle P_{tot}^* \rangle_{i,j}(t)$ may be determined. The first two quantities can be obtained as described above, while the third quantity may be estimated. This can be done, for example, by autoregressive filtering of $\langle P_{tot} \rangle(t)$. One suitable autoregressive filter may be as follows:

$$\langle P_{tot}^* \rangle_{i,j}(s) = \frac{\alpha s}{s + \alpha} \langle P_{tot} \rangle_{i,j}(s).$$

In order to further emphasize the back-off control performance it may be beneficial to allow only differential control action that reduces the scheduler threshold $\gamma_{i,j}(t)$. Thus in one embodiment, only negative contributions from the second term of the control signal $u_{i,j}(s)$ may be allowed. This means that in the time domain, the following restriction to the derivative $\langle P_{tot}^* \rangle_{i,j}(t)$ may be applied:

$$u_{i,j}(t) = C_{i,j}T(\langle P_{tot} \rangle_{i,j}^{ref} - \langle P_{tot} \rangle_{i,j}(t)) - C_{i,j}TT_{D,i,j}\max(0, \langle P_{tot}^* \rangle_{i,j}(t)).$$

In some embodiments, a hard back-off may be applied selectively to the control signal to prevent inadvertent and momentary overshoot of the maximum averaged regulatory power. Thus, the fractional limitation applied to the pool of total radio resources may be set to a predetermined value (e.g. its minimum value $\gamma_{low}$) when the following condition is satisfied:

$$\langle P_{tot}\rangle_{i,j}(t) > \text{margin} \cdot \langle P_{max,regulatory}\rangle$$

where margin is a value slightly below 1 and where $\langle P_{max,regulatory}\rangle$ is the maximum averaged regulatory power (which may be the same as or greater than the output power reference value $\langle P_{tot}\rangle^{ref}$).

In further embodiments, the control mechanism illustrated in FIG. 3 and described above may be selectively enabled and disabled based on the average output power of the radio access node or transmission point. For example, when the average output power is relatively low, far from the maximum averaged regulatory power $\langle P_{max,regulatory}\rangle$, the control mechanism may be disabled. Conversely, when the average output power is relatively high, close to the maximum averaged regulatory power, the control mechanism may be enabled to ensure that the average output power remains below the maximum averaged regulatory power $\langle P_{max,regulatory}\rangle$. For example:

The control mechanism may be turned on when $\langle P_{tot}\rangle_{i,j}(t) > \delta_1 P_{max,site}$ and set $\gamma_{i,j}(t) = 1.0$.

The control mechanism may be turned off when $\langle P_{tot}\rangle_{i,j}(t) < \delta_2 P_{max,site}$.

The values may fulfil the following condition: $\delta_2 P_{max,site} \leq \langle P_{tot}\rangle_{i,j}^{ref} \leq \delta_1 P_{max,site}$.

Thus the transmission power calculator 308 (or equivalently the schedulers 216) receives a control signal indicating a fraction of the total resources available to the transmission point. The transmission power calculator 308 is operative to schedule data for transmission to the groups of wireless devices to that fraction of resources.

The following description relates to a single direction of the plurality of directions. The concepts described below may be repeated for each direction (e.g., in each of the schedulers 216). According to embodiments of the disclosure, the transmission power calculator 308 calculates an effective number of resources for the particular direction, based on the numbers of resources which are to be used for transmitting to each group of wireless devices, weighted by the steering vector (or array vector) and the beamforming weights.

Thus, for SU-MIMO (where a group comprises a single wireless device), and for one wireless device (or UE):

$$NumPrbEquUe_k = \sum_{b_n=0}^{N_{w,ue_k}-1} \left( \frac{\|(\alpha^{i,j})^H w_{b_n,ue_k}\|^2}{\|(w_{b_n,ue_k})^H w_{b_n,ue_k}\|^2} \times \frac{1}{N_{w,ue_k}} \times \frac{1}{N_{ue,mu}} \times N_{UE_k}^{PRB} \right)$$

where $NumPrbEquUe_k$ is the equivalent number of resources (e.g., physical resource blocks or PRBs) for the wireless device $UE_k$ in the direction i,j, $N_{ue,mu}$ is the number of users within the group (which for SU-MIMO is equal to 1), $N_{w,ue_k}$ is the number of beams for the wireless device $UE_k$, $w_{b_n,ue_k}$ is the set of weights for the beam $b_n$, $N_{UE_k}^{PRB}$ is the absolute number of resources (PRBs) allocated to the wireless device $UE_k$, and the superscript H indicates the Hermitian transpose. Thus the equivalent number of resources for the wireless device $UE_k$ in the direction i,j is the absolute number of resources for that wireless device, scaled by a weighted sum over all beams for that wireless device and the steering vector for the direction i,j.

For MU-MIMO, the equivalent quantity for a particular multi-user group $MU_g$ is determined by summing these individual contributions for wireless devices belonging to the group, as follows:

$$NumPrbEquMu_{i,j}^g = \sum_{k \in MU_g} (NumPrbEquUe_k)$$

Then, the total equivalent number of resources in the direction i,j is summed over all groups (where one or more groups may comprise a single user):

$$NumPrbEquAllUe_{i,j} = \sum_{g=0}^{N_{mu}-1} \left( NumPrbEquMu_{i,j}^g \right)$$

This total equivalent number of resources is compared to the fraction of resources defined by the control signal output by the adjuster 304, e.g., $\gamma_{i,j} PRB_{tot}$, where $PRB_{tot}$ is the total number of resources available to the transmission point. If the equivalent number of resources exceeds the fraction of resources defined by the control signal, transmissions to one or more of the groups may be deferred or cancelled for that particular transmission time interval. This aspect is described in more detail below with respect to FIG. 5. However, in one embodiment, transmissions to the group of wireless devices with the highest equivalent number of resources in the direction i,j may be deferred or cancelled. In another embodiment, the group of devices which is to receive the lowest-priority data (e.g., as defined by a quality of service identifier or other suitable priority mechanism) may have transmissions deferred or cancelled.

Once the total equivalent number of resources is equal to or less than the fraction of resources defined by the control signal, the data can be scheduled for transmission accordingly. The transmission power calculator 308 is also able to calculate the corresponding transmit power, based on the scheduled data for transmission, and output that value to the first adding element 310 so that the feedback loop can continue its operation.

As noted above, the regulatory RF EMF exposure requirements are typically expressed in terms of an average exposure over a defined time interval T. In the illustrated embodiment, this averaging requirement is addressed by averaging the (scaled) beamforming gain in the averaging modules 208.

Figure 4:
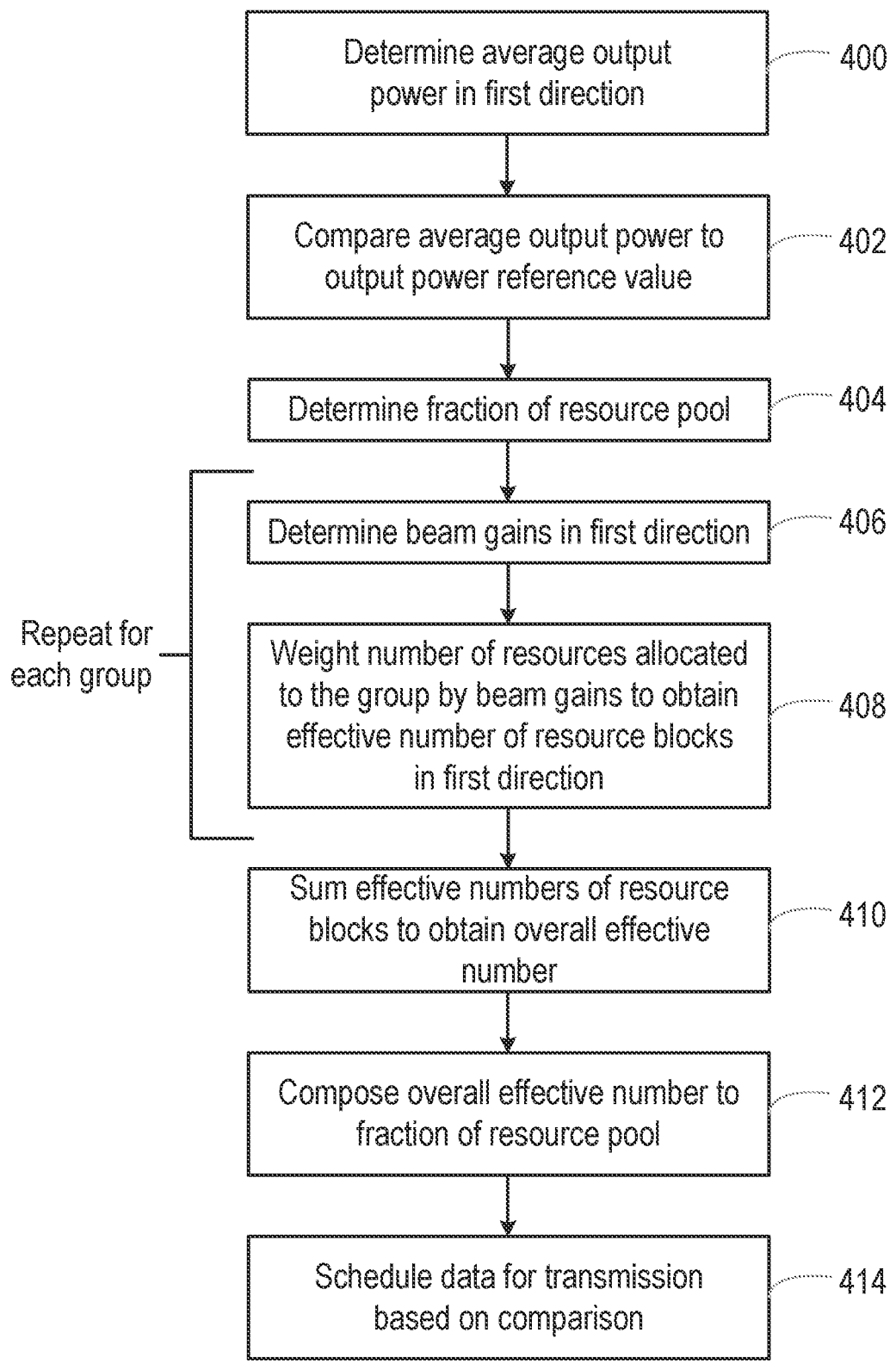
FIG. 4 is a flowchart of a method according to embodiments of the disclosure.

FIG. 4 is a flowchart of a method according to embodiments of the disclosure. The method may be implemented in a network node, such as the radio access node 112 described above. Alternatively, the method may be implemented in a scheduler within or logically coupled to such a radio access node. The method schedules data for transmission by a transmission point (e.g., the radio access node or a transmission point belonging to the radio access node) to one or more wireless devices (e.g., such as the wireless devices 116 described above), or particularly to one or more groups of one or more wireless devices, such that the power is below a threshold pre-determined to meet a regulatory RF exposure requirement in a first direction emanating from the transmission point. The first direction a is defined by the indexes i and j representing the solid angle in the azimuth and elevation angles respectively. The method may be repeated for different directions.

The method begins in step 400, in which the average output power of the radio access node in the first direction over a period of time is determined. The average output power may be determined by measurement, e.g. of radio signals, just prior to transmission via the antenna or antenna array. In one embodiment this can be done by couplers that measure the radio signal amplitude at each signal path to an antenna element. These amplitudes can then be combined into a total output power of the radio, with the antenna gain removed.

Based on such measurements, the averaged power can be constructed by integration as $$\langle P_{tot}\rangle_{i,j}(t) = \frac{1}{T}\int_{t-T}^{t} P_{tot,i,j}(\tau)d\tau$$

Here $P_{tot,i,j}(t)$ is the total measured power in the radio in the direction i,j at time t and T is the averaging time specified in the applicable RF EMF exposure regulation. $\tau$ is a dummy time variable. In practice, the integral may be replaced by summation, e.g., using Euler of Tustin approximation based discretization.

Alternatively, the output power of the radio access node may be predicted using information available in the scheduler or elsewhere in base band. For example, the estimated output power may be obtained based on the fraction of radio resources (e.g., PRBs) in use at one time, and then averaging this quantity over a period of time. Thus the momentary scheduled power as estimated by the fraction of PRBs used at each time instant may be summed over the time T, and then divided by the time T to obtain the average.

This approach is however subject to a number of errors. These include e.g. the actual power needed for re-transmissions, signal scaling and quantization errors, as well as errors caused by radio signal processing close to the antenna, including e.g. clipping to achieve peak to average power reductions, as well as antenna calibration errors.

In step 402, the determined average output power is compared to an output power reference signal value $\langle P_{tot}\rangle_{i,j}^{ref}$. This output power reference value may be set with reference to a maximum averaged regulatory power $\langle P_{max,regulatory}\rangle$ that has been pre-determined to meet a regulatory RF EMF exposure requirement. For example, in one embodiment the output power reference value $\langle P_{tot}\rangle_{i,j}^{ref}$ is the maximum averaged regulatory power $\langle P_{max,regulatory}\rangle$; in other embodiments, the output power reference value $\langle P_{tot}\rangle_{i,j}^{ref}$ may be set below the maximum averaged regulatory power.

The transmission point has a total pool of radio resources with which to schedule transmissions to one or more wireless devices (e.g. wireless devices 116 served by the radio access node). In step 404, this pool of radio resources is adjusted based on the comparison in step 402, to determine a fraction of that total pool of radio resources. The fraction of the pool of radio resources may be determined based on a control signal generated using a similar mechanism to that described above with respect to FIG. 3. For example, in one embodiment, the control signal is indicative of a change, or a rate of change, to a pool of radio resources available to the scheduler for downlink transmissions to one or more wireless devices in the first direction.

The control signal may be generated according to a proportional derivative control scheme, which has at least one component which is proportional to the difference between the output power reference value and the average output power, and at least one component which is proportional to the time derivative of the difference between the output power reference value and the average output power. For example, the control signal may be indicative of (or used to calculate) a fraction of the pool of radio resources or a rate of change of the fraction of the pool of radio resources. By applying this fraction to the pool of resources, an adjusted pool of resources is generated which may be reduced in size compared to the total pool of radio resources. Depending on the state of the feedback control scheme, the adjustment to the pool of resources may be positive or negative.

In step 406, the (normalized) beam gains in the first direction for each wireless device belonging to each group of one or more wireless devices are determined. For example, the beam gains in the first direction for a particular beam $b_n$ to a particular wireless device $UE_k$ may be calculated according to the following:

$$\frac{\|(\alpha^{i,j})^H w_{b_n,ue_k}\|^2}{\|(w_{b_n,ue_k})^H w_{b_n,ue_k}\|^2}$$

Similar quantities for different beams and different wireless devices are obtained correspondingly.

In step 408, the number of resources $N_{UE_k}^{PRB}$ allocated to the particular wireless device $UE_k$ is weighted by the (normalized) beam gain for a beam $b_n$ as follows $$\frac{\|(\alpha^{i,j})^H w_{b_n,ue_k}\|^2}{\|(w_{b_n,ue_k})^H w_{b_n,ue_k}\|^2} \times \frac{1}{N_{w,ue_k}} \times \frac{1}{N_{ue,mu}} \times N_{UE_k}^{PRB}$$

It will be noted that this quantity is further scaled by the number of beams $N_{w,ue_k}$ for the particular wireless device and the number of wireless devices $N_{ue,mu}$ in the group to which the particular wireless device $UE_k$ belongs. $w_{b_n,ue_k}$ is the set of weights for the beam $b_n$, $\alpha^{i,j}$ is the steering vector (or array vector) for the direction i,j, and the superscript H indicates the Hermitian transpose. This step is repeated for each beam for the particular wireless device $UE_k$, and then further repeated for other wireless devices.

In step 410, these effective or equivalent numbers of resource blocks in the first direction are summed to obtain an overall effective number of resources in the first direction as follows (first over all $N_{w,ue_k}$ beams for the particular wireless device, then for the group to which the wireless device belongs, then for all groups):

$$NumPrbEquUe_k = \sum_{b_n=0}^{N_{w,ue_k}-1}\left(\frac{\|(\alpha^{i,j})^H w_{b_n,ue_k}\|^2}{\|(w_{b_n,ue_k})^H w_{b_n,ue_k}\|^2} \times \frac{1}{N_{w,ue_k}} \times \frac{1}{N_{ue,mu}} \times N_{UE_k}^{PRB}\right)$$

-continued $$NumPrbEquMu_{i,j}^g = \sum_{k \in MU_g} (NumPrbEquUe_k)$$

$$NumPrbEquAllUe_{i,j} = \sum_{g=0}^{N_{mu}-1} (NumPrbEquMu_{i,j}^g).$$

In step 412, the overall effective number of resources in the first direction is compared to the fraction of resources calculated in step 404, and in step 414 data is scheduled for transmission based on that comparison. Further detail regarding this aspect is provided below with respect to FIG. 5.

The radio access node may then proceed to transmit wireless signals to the one or more wireless devices according to the scheduled resources. In some embodiments the method shown in FIG. 4 is iterative. Thus, the average output power of the radio access node is again determined (i.e. as described with respect to step 400), and compared to an output power reference value. Thus the method may continue to adjust the pool of radio resources and so adjust the output power of the radio access node.

Figure 5:
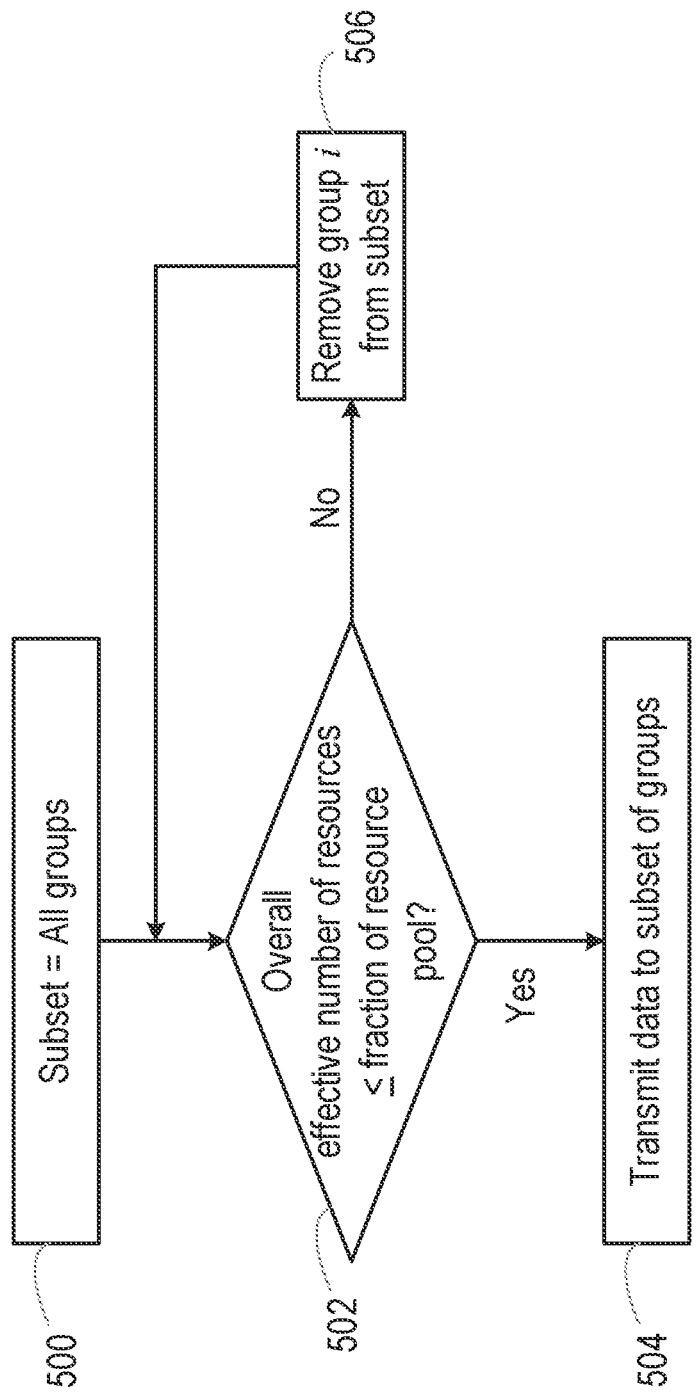
FIG. 5 is a flowchart of a method according to further embodiments of the disclosure.

FIG. 5 is a flowchart of a method according to embodiments of the disclosure, for scheduling data for transmission by a transmission point (e.g., the radio access node or a transmission point belonging to the radio access node) to one or more wireless devices (e.g., such as the wireless devices 116 described above), or particularly to one or more groups of one or more wireless devices, such that the power is below a threshold pre-determined to meet a regulatory RF exposure requirement in a first direction emanating from the transmission point. The method may be repeated for different directions. The method may be employed in steps 412 and 414, described above.

The method begins in step 500, in which a subset of groups of one or more wireless devices is initially defined as being all of the groups served by the transmission point (or all of the groups under consideration within the method). The method proceeds by iteratively removing groups of one or more wireless devices from this subset until the equivalent number of resources in the first direction is less than or equal to the available fraction of the resource pool.

Thus in step 502, the overall effective number of resources in the first direction (e.g., as determined above in step 410) is compared to the available fraction of resources (e.g., as determined in step 404). The fraction of resources may be defined by $\gamma_{i,j}PRB_{tot}$, for example, where $\gamma_{i,j}$ is the control signal for the direction i,j (as calculated using the mechanism of FIG. 3) and $PRB_{tot}$ is the total number of resources available to the transmission point.

If the overall effective number of resources in the first direction does not exceed the available fraction of resources, the method proceeds to step 504 in which data is scheduled for transmission to the subset of groups (which initially may be all of the groups as noted above), and then transmitted using the defined fraction of resources.

However, if the overall effective number of resources in the first direction exceeds the available fraction of resources, the method proceeds to step 506 in which one of the groups is removed from the subset (here denoted as the ith group). The group which is removed may differ according to different embodiments. In one embodiment, for example, the group within the subset which has the highest effective number of resources in the first direction is removed. In another embodiment, the group within the subset which has the lowest effective number of resources in the first direction is removed. In further embodiments, the nature of the data which is to be transmitted may be taken into account. For example, in one embodiment the group which has the lowest-priority data (e.g., as defined by a quality of service identifier or similar) may be removed from the subset. In this way, critical data such as ultra-reliable low-latency communications should not be adversely impacted or delayed.

The method then reverts to step 502, in which the overall effective number of resources for the subset (after removal of the ith subset) is again compared to the fraction of resources. If the overall effective number of resources in the first direction still exceeds the fraction, a further group is removed according to which algorithm is implemented. Eventually, the overall effective number of resources in the first direction will not exceed the fraction, and the data can be scheduled for transmission to the subset in step 504.

Figure 6:
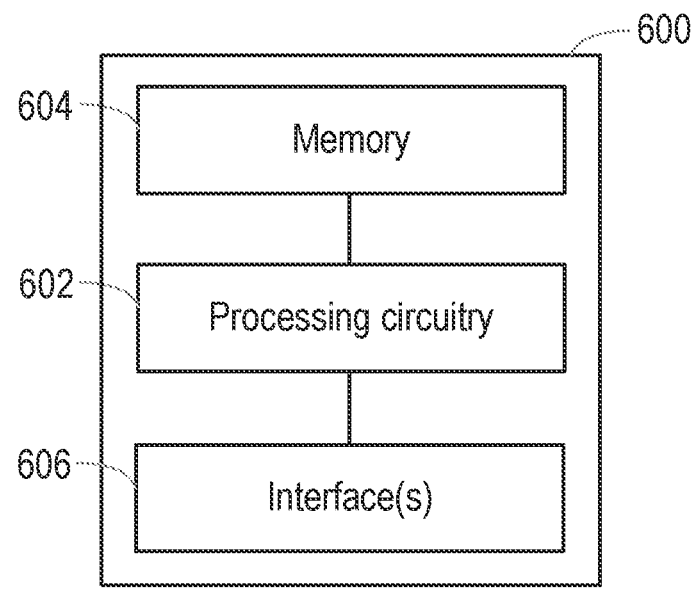
FIG. 6 is a schematic diagram of a network node according to embodiments of the disclosure.

FIG. 6 is a schematic diagram of a network node 600 according to embodiments of the disclosure. The network node 600 may be configured to implement the methods described above with respect to FIGS. 4 and 5, for example. The network node 600 may comprise or be implemented in a radio access node (such as the radio access node 112) of a wireless communications network. Alternatively, the network node 600 may comprise or be implemented in a scheduler communicatively coupled to such a radio access network node. The radio access network node comprises a multiple-input, multiple-output, MIMO, transmission point for the wireless communications network. The MIMO transmission point serves one or more groups of wireless devices, with each group comprising one or more wireless devices. The MIMO transmission point utilizes respective pluralities of beam weights to transmit corresponding pluralities of beams to each group of wireless devices, with respective numbers of resources being allocated for transmissions to each group of wireless devices.

The network node 600 comprises processing circuitry (such as one or more processors) 602 and a non-transitory machine-readable medium 604 (such as memory). The memory may store instructions which, when executed by the processing circuitry 602, cause the network node to: determine an average output power of the transmission point over a period of time in a first direction of a plurality of directions radiating from the transmission point; compare the average output power to an output power reference value; determine a fraction of a pool of available resources for the allocation of data to be transmitted by the transmission point, wherein the fraction varies as a function of the comparison between the average output power and the output power reference value; for each group of wireless devices, determine beam gains in the first direction for each of the plurality of beams and weight the number of resources allocated to the group of wireless devices according to the determined beam gains to obtain an effective number of resource blocks in the first direction for each group of wireless devices; sum the effective numbers of resources in the first direction to obtain an overall effective number of resources in the first direction; compare the overall effective number of resources to the fraction of the pool of available resources; and schedule data for transmission to the groups of wireless devices based on the comparison between the overall effective number of resources and the fraction of the pool of available resources.

The network node 600 may further comprise one or more interfaces 606, for transmitting signals to and/or receiving signals from other network nodes of the wireless communications network. The interfaces 606 may comprise circuitry for the transmission and/or reception of electrical, optical or wireless signals.

The interface(s) 606, processing circuitry 602 and machine-readable medium 602 may be connected together in any suitable manner. In the illustrated embodiment, the components are coupled together directly, in series. In alternative embodiments, the components may be coupled to each other via a system bus or other communication line.

Figure 7:
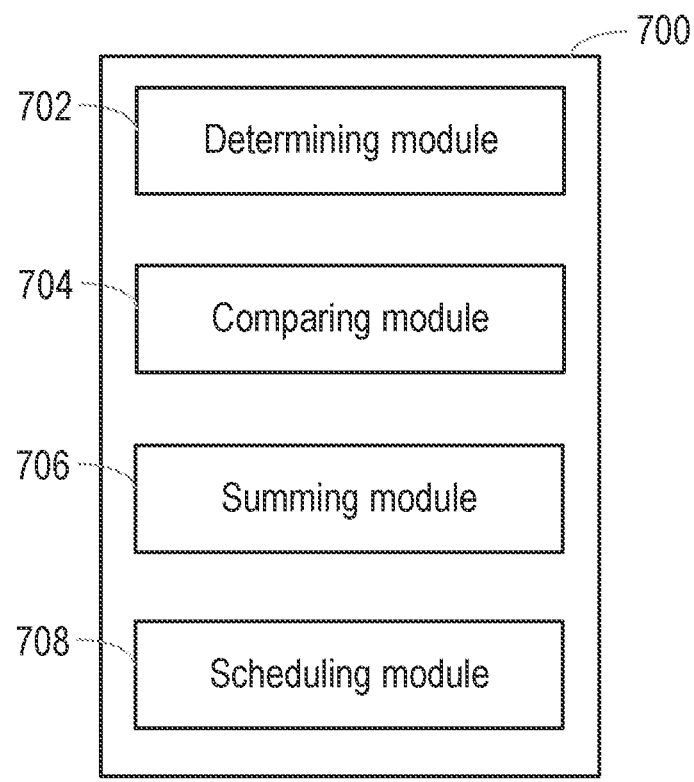
FIG. 7 is a schematic diagram of a network node according to further embodiments of the disclosure.

FIG. 7 is a schematic diagram of a network node 700 according to further embodiments of the disclosure.

The network node 700 may be configured to implement the methods described above with respect to FIGS. 4 and 5, for example. The network node 700 may comprise or be implemented in a radio access node (such as the radio access node 112) of a wireless communications network. Alternatively, the network node 700 may comprise or be implemented in a scheduler communicatively coupled to such a radio access network node. The radio access network node comprises a multiple-input, multiple-output, MIMO, transmission point for the wireless communications network. The MIMO transmission point serves one or more groups of wireless devices, with each group comprising one or more wireless devices. The MIMO transmission point utilizes respective pluralities of beam weights to transmit corresponding pluralities of beams to each group of wireless devices, with respective numbers of resources being allocated for transmissions to each group of wireless devices.

The network node 700 comprises a determining module 702, a comparing module 704, a summing module 706 and a scheduling module 708. In one embodiment, the determining module 702 is configured to determine an average output power of the transmission point over a period of time in a first direction of a plurality of directions radiating from the transmission point. The comparing module 704 is configured to compare the average output power to an output power reference value. The determining module 702 is further configured to: determine a fraction of a pool of available resources for the allocation of data to be transmitted by the transmission point (where the fraction varies as a function of the comparison between the average output power and the output power reference value); for each group of wireless devices, determine beam gains in the first direction for each of the plurality of beams and weight the number of resources allocated to the group of wireless devices according to the determined beam gains to obtain an effective number of resource blocks in the first direction for each group of wireless devices. The summing module 706 is configured to sum the effective numbers of resources in the first direction to obtain an overall effective number of resources in the first direction. The comparing module 704 is further configured to compare the overall effective number of resources to the fraction of the pool of available resources. The scheduling module 708 is configured to schedule data for transmission to the groups of wireless devices based on the comparison between the overall effective number of resources and the fraction of the pool of available resources.

The network node 700 may further comprise one or more interface modules, for transmitting signals to and/or receiving signals from other network nodes of the wireless communications network. The interface modules may comprise circuitry for the transmission and/or reception of electrical, optical or wireless signals.

In one embodiment, the modules of the network node 700 are implemented purely in software. In another embodiment, the modules of the network node 700 are implemented purely in hardware. In a further embodiment, the modules of the network 700 are implemented in a combination of hardware and software.

Thus the disclosure provides methods, apparatus and machine-readable mediums for controlling the transmit output power of a transmission point. In particular, the disclosure provides a mechanism for smoothly varying the transmit output power so that the time-averaged value in a particular direction is below a threshold that has been pre-determined to comply with a regulatory RF EMF exposure requirement.

It should be noted that the above-mentioned embodiments illustrate rather than limit the concepts disclosed herein, and that those skilled in the art will be able to design many alternative embodiments without departing from the scope of the appended following statements and claims. The word "comprising" does not exclude the presence of elements or steps other than those listed in a statement or claim, "a" or "an" does not exclude a plurality, and a single processor or other unit may fulfil the functions of several units recited in the statements. Any reference signs in the statements and claims shall not be construed so as to limit their scope.

APPENDIX

The following subsection explains the basics of the terminology used. It is stressed that this terminology is part of the prior art in the field of automatic control. A number of representations of a dynamic process may be introduced. A dynamic process is one where the output depends not only on the present input signal but also on previous inputs and outputs. In other words, the dynamic process has memory. The most basic dynamic process is the linear one that can be described by a differential equation as $$y^{(n)}(t)+a_1 y^{(n-1)}(t)+\ldots+a_n y(t)=b_0 u^{(m)}(t)+\ldots b_m u(t)$$

Here y(t) is the output signal, u(t) is the input signal, t is the time, while $a_i$, i=1, ..., n and $b_j$, j=0, ..., m are constant parameters. The superscript $^{(i)}$ denotes differentiation with respect to time i times. The above differential equation has order n. It has one input signal and one output signal. For simplicity all concepts are explained in this context, but those skilled in the art will appreciate that the concepts can be generalized to more than one input signal and/or more than one output signal.

By taking Laplace transforms and setting initial values to zero, the differential equation is transformed to be represented by a transfer function H(s), where s denotes the Laplace transform variable, which is closely related to the angular frequency used in Fourier transforms. The result is $$H(s)=\frac{B(s)}{A(s)}=\frac{b_0 s^m+b_1 s^{m-1}+\ldots+b_m}{s^n+a_1 s^{n-1}+\ldots+a_n}.$$

The relationship between the output signal Laplace transform Y(s) and the input signal Laplace transform U(s) is $$Y(s)=H(s)U(s).$$

The poles $p_i$ (where l=1, ..., n) of the process are given by the equation A(s)=0. For simplicity only strictly stable (open loop) processes with all poles in the left complex half plane are considered here. In general, poles can be real or complex conjugate pairs.

The properties of the dynamic process can also be studied in the frequency domain in terms of complex-valued frequency functions Y(jω), H(jω) and U(jω). ω denotes the angular frequency that fulfils $$\omega=2\pi f,$$

where f is the frequency in Hz. References to frequency hereinafter are to be understood as references to angular frequency.

Figure 8:
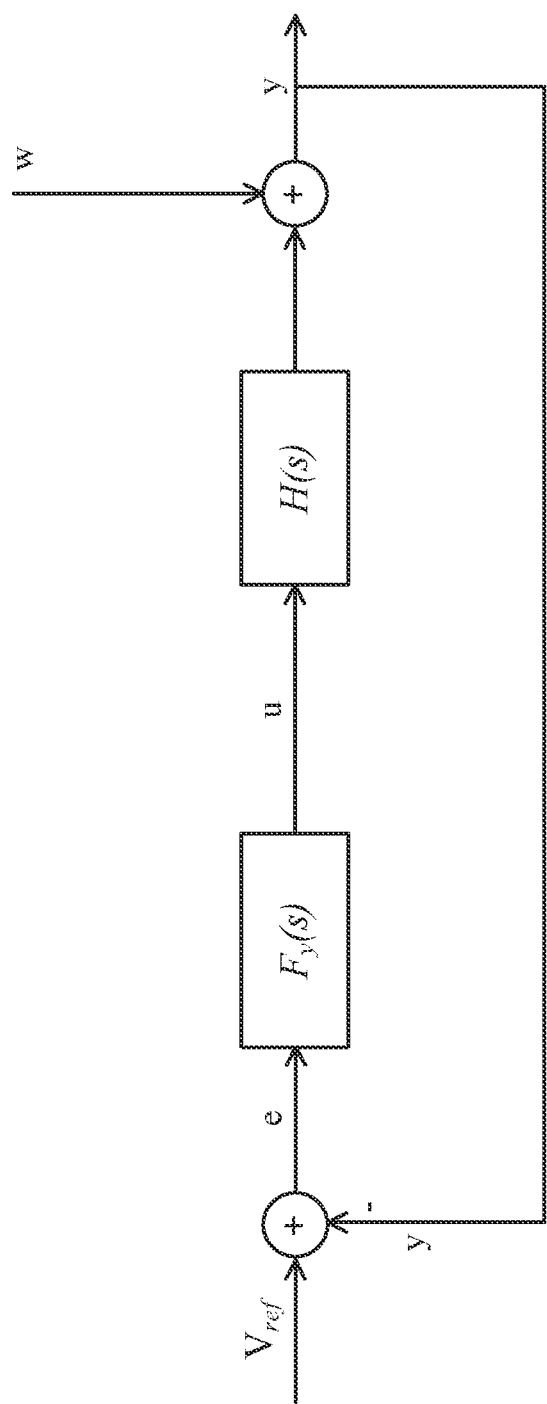
FIG. 8 is a block diagram of an automatic control scheme.

The following definition is best explained with respect to FIG. 8, where $F_y(s)$ is the feedback gain. The closed loop system is then computed as follows $$Y(s)=W(s)+H(s)F_y(s)(Y_{ref}(s)-Y(s)),$$

which gives $$Y(s) = \frac{F_y(s)H(s)}{1+F_y(s)H(s)}Y_{ref}(s) + \frac{1}{1+F_y(s)H(s)}W(s).$$

This gives the effect of the reference signal and the disturbance on the output. The remaining definitions now follow:

The closed loop bandwidth $\omega_{CL}$ of the control system is given by the equation $$\left|\frac{F_y(j\omega_{CL})H(j\omega_{CL})}{1+F_y(j\omega_{CL})H(j\omega_{CL})}\right|^2 = \frac{1}{2}\left|\frac{F_y(0)H(0)}{1+F_y(0)H(0)}\right|^2.$$

The closed loop static error of the control system is given by the equation $$y_{ref} - y = \frac{1}{1+F_y(0)H(0)}(y_{ref} - w),$$

The static disturbance rejection of the control system is given by the static sensitivity function $$S(0) = \frac{1}{1+F_y(0)H(0)}.$$

The dynamic disturbance rejection of the control system is determined by the sensitivity function $$S(j\omega) = \frac{1}{1+F_y(j\omega)H(j\omega)}$$

The complimentary sensitivity function of the control system, $T(j\omega)=1-S(j\omega)$ determines the robustness of the control system with respect to un-modelled dynamics.

The invention claimed is:

1. A method for controlling an output of a multiple-input, multiple-output, MIMO, transmission point for a wireless communications network, the transmission point serving one or more groups of wireless devices, each group comprising one or more wireless devices, the MIMO transmission point utilizing respective pluralities of beam weights to transmit corresponding pluralities of beams to each group of wireless devices, respective numbers of resources being allocated for transmissions to each group of wireless devices, the method comprising:

determining an average output power of the transmission point over a period of time in a first direction of a plurality of directions radiating from the transmission point;

comparing the average output power to an output power reference value;

determining a fraction of a pool of available resources for the allocation of data to be transmitted by the transmission point, wherein the fraction varies as a function of the comparison between the average output power and the output power reference value;

for each group of wireless devices, determining beam gains in the first direction for each of the plurality of beams and weighting the number of resources allocated to the group of wireless devices according to the determined beam gains to obtain an effective number of resources in the first direction for each group of wireless devices;

summing the effective numbers of resources in the first direction to obtain an overall effective number of resources in the first direction;

comparing the overall effective number of resources to the fraction of the pool of available resources; and scheduling data for transmission to the groups of wireless devices based on the comparison between the overall effective number of resources and the fraction of the pool of available resources.

2. The method according to claim 1, wherein the step of scheduling data comprises determining a subset of the plurality of groups of wireless devices based on the comparison between the overall effective number of resources and the fraction of the pool of available resources, and scheduling data for transmission to the subset of the groups of wireless devices.

3. The method according to claim 2, wherein determining the subset of the plurality of groups of wireless devices comprises iteratively removing one or more groups of wireless devices from the subset until the overall effective number of resources is equal to or less than the fraction of the pool of available resources.

4. The method according to claim 3, wherein the group of wireless devices having the greatest effective number of resources in the first direction is removed between each iteration.

5. The method according to claim 1, wherein each group of wireless devices comprises a single wireless device.

6. The method according to claim 1, wherein each group of wireless devices comprises a plurality of wireless devices.

7. The method according to claim 6, wherein the step of determining beam gains in the first direction for each of the plurality of beams further comprises the substeps of:

determining beam gains in the first direction for each of the plurality of beams for each wireless device in the group;

weighting a number of resources allocated to each wireless device in the group according to the determined beam gains to obtain an effective number of resource blocks in the first direction for each wireless device; and summing effective number of resource blocks in the first direction for each wireless device to obtain the effective number of resource blocks in the first direction for the group of wireless devices.

8. The method according to claim 1, wherein determining the average output power of the transmission point over a period of time in the first direction comprises:

determining an average output power of the transmission point in all directions;

determining an average beamforming gain over the period of time in the first direction; and weighting the average output power of the transmission point in all directions by the average beamforming gain in the first direction.

9. The method according to claim 1, further comprising:
generating a control signal based on the comparison between the average output power and the output power reference value, and adjusting the fraction based on the control signal.

10. The method according to claim 9, wherein the control signal is generated using a proportional-derivative control scheme.

11. The method according to claim 10, wherein the control signal comprises a first term which is proportional to a difference between the average output power and the output power reference value.

12. The method according to claim 10, wherein the control signal comprises a second term which is proportional to a time-derivative of the average output power.

13. The method according to claim 12, wherein the second term is restricted to values which are equal to or less than zero.

14. The method according to claim 1, wherein the plurality of beam weights are calculated based on reciprocity-assisted transmission, or predefined in a codebook of beam weights.

15. A network node for controlling an output of a multiple-input, multiple-output, MIMO, transmission point for a wireless communications network, the transmission point serving one or more groups of wireless devices, each group comprising one or more wireless devices, the MIMO transmission point utilizing respective pluralities of beam weights to transmit corresponding pluralities of beams to each group of wireless devices, respective numbers of resources being allocated for transmissions to each group of wireless devices, the network node comprising processing circuitry and a non-transitory machine-readable medium storing instructions which, when executed by the processing circuitry, cause the network node to:
determine an average output power of the transmission point over a period of time in a first direction of a plurality of directions radiating from the transmission point;
compare the average output power to an output power reference value;
determine a fraction of a pool of available resources for the allocation of data to be transmitted by the transmission point, wherein the fraction varies as a function of the comparison between the average output power and the output power reference value;
for each group of wireless devices, determine beam gains in the first direction for each of the plurality of beams and weight the number of resources allocated to the group of wireless devices according to the determined beam gains to obtain an effective number of resource blocks in the first direction for each group of wireless devices;
sum the effective numbers of resources in the first direction to obtain an overall effective number of resources in the first direction;
compare the overall effective number of resources to the fraction of the pool of available resources; and
schedule data for transmission to the groups of wireless devices based on the comparison between the overall effective number of resources and the fraction of the pool of available resources.

16. The network node according to claim 15, wherein to schedule data, the instructions when executed by the processing circuitry causes the network node to determine a subset of the plurality of groups of wireless devices based on the comparison between the overall effective number of resources and the fraction of the pool of available resources, and to schedule data for transmission to the subset of the groups of wireless devices.

17. The network node according to claim 16, wherein to determine the subset of the plurality of groups of wireless devices, the instructions when executed by the processing circuitry causes the network node to iteratively remove one or more groups of wireless devices from the subset until the overall effective number of resources is equal to or less than the fraction of the pool of available resources.

18. A computer program product comprising a non-transitory computer readable medium storing instructions executable by processing circuitry of a network node for controlling an output of a multiple-input, multiple-output, MIMO, transmission point for a wireless communications network, the transmission point serving one or more groups of wireless devices, each group comprising one or more wireless devices, the MIMO transmission point utilizing respective pluralities of beam weights to transmit corresponding pluralities of beams to each group of wireless devices, respective numbers of resources being allocated for transmissions to each group of wireless devices, the instructions when executed by the processing circuitry causes the network node to:
determine an average output power of the transmission point over a period of time in a first direction of a plurality of directions radiating from the transmission point;
compare the average output power to an output power reference value;
determine a fraction of a pool of available resources for the allocation of data to be transmitted by the transmission point, wherein the fraction varies as a function of the comparison between the average output power and the output power reference value;
for each group of wireless devices, determine beam gains in the first direction for each of the plurality of beams and weight the number of resources allocated to the group of wireless devices according to the determined beam gains to obtain an effective number of resource blocks in the first direction for each group of wireless devices;
sum the effective numbers of resources in the first direction to obtain an overall effective number of resources in the first direction;
compare the overall effective number of resources to the fraction of the pool of available resources; and
schedule data for transmission to the groups of wireless devices based on the comparison between the overall effective number of resources and the fraction of the pool of available resources.

19. The computer program product according to claim 18, wherein to schedule data, the instructions when executed by the processing circuitry causes the network node to determine a subset of the plurality of groups of wireless devices based on the comparison between the overall effective number of resources and the fraction of the pool of available resources, and to schedule data for transmission to the subset of the groups of wireless devices.

20. The computer program product according to claim 19, wherein to determine the subset of the plurality of groups of wireless devices, the instructions when executed by the processing circuitry causes the network node to iteratively remove one or more groups of wireless devices from the subset until the overall effective number of resources is equal to or less than the fraction of the pool of available resources.

* * * * *